June 16, 1953    B. E. HOUSE    2,642,159
BRAKE
Filed Dec. 16, 1947    3 Sheets-Sheet 1

INVENTOR
BRYAN E. HOUSE
BY
T.J. Plante
ATTORNEY

June 16, 1953          B. E. HOUSE          2,642,159
BRAKE
Filed Dec. 16, 1947          3 Sheets-Sheet 2
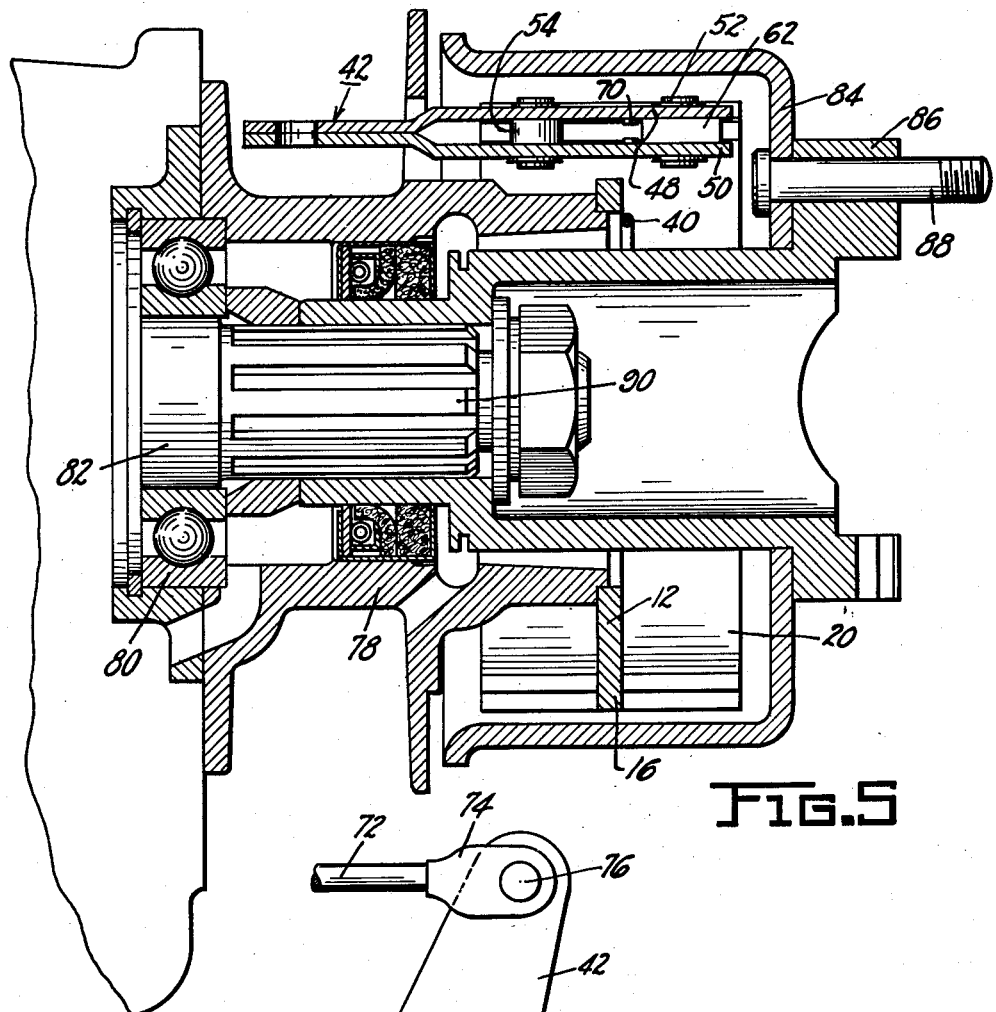
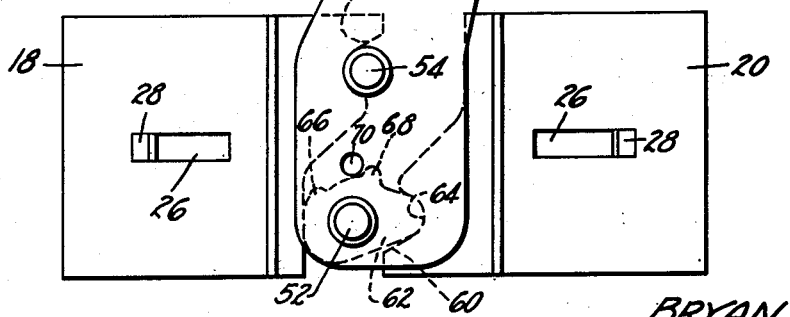
INVENTOR
BRYAN E. HOUSE
BY
T. J. Plante
ATTORNEY INVENTOR
BRYAN E. HOUSE
BY
T. J. Plante
ATTORNEY Patented June 16, 1953

2,642,159

UNITED STATES PATENT OFFICE 2,642,159

BRAKE

Bryan E. House, South Bend, Ind., assignor to Bendix Aviation Corporation, South Bend, Ind., a corporation of Delaware Application December 16, 1947, Serial No. 792,019

19 Claims. (Cl. 188—78)

This invention relates to improvements in the construction and arrangement of brakes, and has as its primary object the provision of a simplified, and therefore inexpensive, brake.

The brake described herein is particularly suitable for use as the propeller shaft parking brake of an automobile. At the present time, most automobiles derive their emergency, or parking, brake operation from actuation of a lever and strut provided in each of the rear wheel brakes of the vehicle. Trucks and buses utilize, as an emergency, or parking, brake, a fifth brake which is entirely independent of the wheel brakes, and which is arranged to act directly on the propeller shaft of the vehicle. The propeller shaft type of parking brake has certain advantages. It is much closer to the actuating lever than the rear wheel brakes, thus simplifying the applying linkage and reducing friction losses in the linkage. In addition, the propeller shaft parking brake has a higher mechanical advantage than the rear wheel parking brakes, owing to the relatively high rotational speed of the propeller shaft.

Because the propeller shaft parking brake is an additional brake on the vehicle, if it is to be used in place of the present rear wheel parking brake arrangement, it must combine simplicity and effectiveness in such a way as to be an inexpensive substitute for the conventional arrangement.

Among the advantages and novel features of my improved brake, which make it particularly suitable for use as a propeller shaft parking brake, are the following:

(1) The brake shoes consist of flat, arcuate strips, omitting the usual strengthening webs, thereby reducing cost and increasing the space available in the brake assembly;

(2) The center plane of the brake coincides with the plane of the supporting plate, and the supporting plate is provided with ears which extend into slots in the shoes to guide the shoes; and (3) The applying lever acts directly on the rims of the shoes at axially spaced points of engagement, the lever being supported by the shoe rims, which extend between the spaced side portions of the lever.

Other objects and advantages of the present invention will become apparent during the following description of a plurality of illustrative embodiments of the invention, reference being had therein to the accompanying drawings in which:

Figure 3 is a plan view of the brake assembly of Figure 1;

Figure 5 is a sectional view showing the brake of Figures 1 to 4 mounted in position on the propeller shaft of an automotive vehicle;

Figure 1:
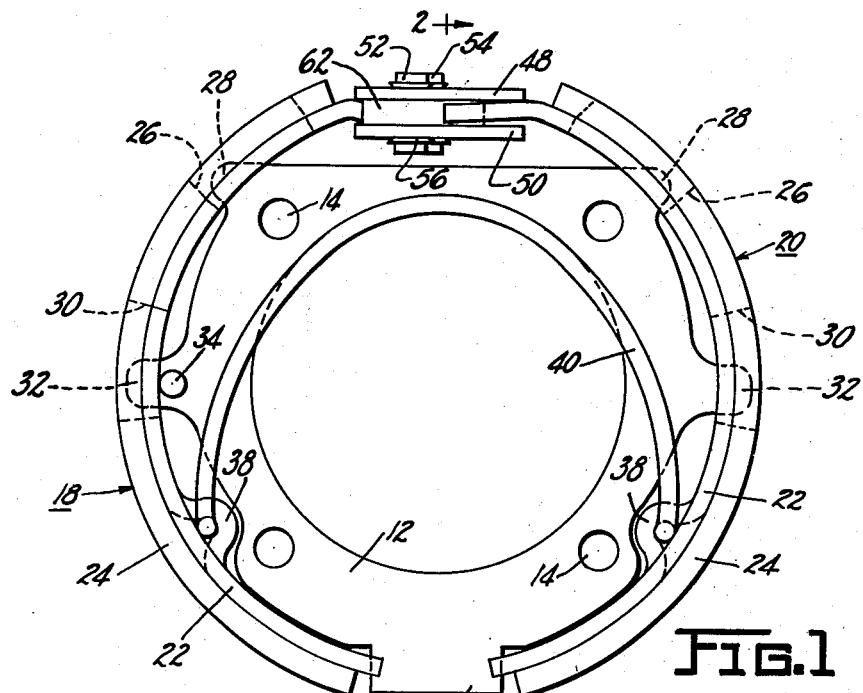
Figure 1 is an elevational view of a brake assembly which embodies the invention.

Referring to the brake shown in Figures 1 to 4, a flat annular supporting plate, or spider, 12 is adapted to be secured to a non-rotatable member by means of suitable fastening members extending through the openings 14 provided in the plate. The supporting plate 12, which will ordinarily be formed by stamping, has an integral radially-extending projection, or arm, 16, which is arranged to serve as the anchor for the brake shoes.

Two brake shoes 18 and 20 are provided, which are preferably identical in construction, and each of which is a flat, arcuate strip, consisting solely of a metal backing member, or rim, 22 and a friction material lining 24 secured thereto. Omission of the customary strengthening webs in the shoe construction, while it sacrifices the additional stiffening effect obtained from such webs, has several important advantages in the brake arrangement disclosed herein. In addition to reducing cost, the shoe construction shown also increases the available space at the center of the brake assembly, which is particularly important in a small diameter brake, and permits the center line of the brake shoes to coincide with the plane of the supporting plate 12, without requiring much space between the brake drum and the mounting circle of the bolt openings 14.

The shoes are guided, i. e. prevented from moving laterally, by means of integral ears formed on the supporting plate, or spider, 12, which extend into radial slots provided in the shoes. Each shoe has an upper slot 26 which receives the corresponding ear 28 on the spider, and a central slot 30 which receives the corresponding ear 32 on the spider. The slots extend through both the rim 22 and lining 24 of the shoes. In order to hold the entire shoe assembly in its proper concentric relation with the brake drum, a laterally extending nib 34 is formed on ear 32 at the left side of the supporting plate to engage the underside of the shoe rim of shoe 18 and thereby prevent horizontal shifting movement of the shoe assembly.

The lower end of the rim of each brake shoe has a notch 36 formed therein to engage one side of the anchor projection 16. Thus the anchor projection, in addition to receiving the anchoring torque of the shoes, also assists in guiding the shoes. An integral spring-retaining strap 38 is formed on the rim of each of the brake shoes, the respective straps being engaged by opposite ends of a shoe return spring 40. In order to hold cost to a minimum, and also obtain the maximum unencumbered space at the center of the brake assembly, the return spring is preferably constituted by a substantially U-shaped wire member, as shown. The force required normally to hold the brake shoes in released position is relatively light, and a spring of this type will suffice for the job. In the usual arrangement, the applying cable which actuates the brake will have its own return spring, and the demand on the shoe return spring 40 is therefore limited to the effort required to release the shoes.

Figure 2:
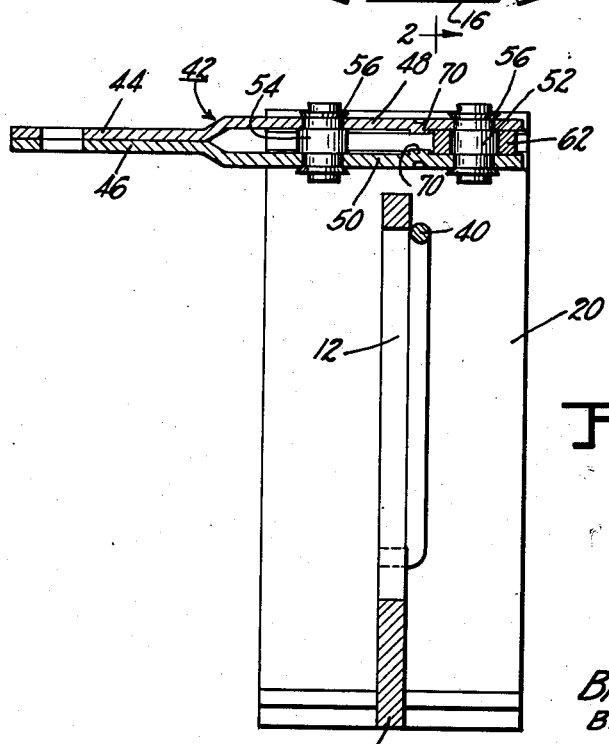
Figure 2 is a section taken on the line 2—2 of Figure 1.

The actuating mechanism of the brake has been designed to provide a very simple and inexpensive structure. It consists of a lever 42, which is carried by the upper ends of the brake shoes. As shown in Figure 2, lever 42 may consist of two metal plates 44 and 46, which engage one another at one end and which have spaced-apart portions 48 and 50 at the other end. The upper ends of the rims of the two shoes extend into the space provided between portions 48 and 50 of the applying lever plates, thereby positioning and supporting the lever on the shoes. The engaging portions 44 and 46 of the applying lever plates may be secured together by spot welding. The spaced portions 48 and 50 may be secured together and at the same time held apart the desired distance by means of pins 52 and 54, which have large diameter center portions to serve as spacers between the lever plates, the pins 52 and 54 having riveted ends 56 which secure the pins to the lever plates.

The pins 52 and 54 serve as pivotal points of engagement between lever 42 and the brake shoes. The end of the rim of shoe 18 is provided with a concave indentation 58 near one side thereof, and the end of the rim of shoe 20 is provided with a concave indentation 60 near the side thereof remote from the indentation in shoe 18. Thus the indentations in the rims of the two shoes provide axially-spaced points of engagement between the applying lever and the shoes. Pin 54 fits in indentation 58 and directly engages shoe 18, whereas pin 52 has a short strut 62 pivoted thereon. The curved end 64 of strut 62 engages the indentation 60 in shoe 20. Strut 62 is used to provide the operative connection between the applying lever and shoe 20 in order to compensate for the axial movement of pin 52 relative to shoe 20 as the lever is rotated, strut 62 pivoting on pin 52 to provide such compensation. In order to prevent strut 62 from becoming improperly oriented in the lever assembly, and thereby interfering with the assembling operation, two small ears 66 and 68 are provided on the edge of strut 62, the arrangement being such that one of the ears 66 or 68 engages the aligned nibs 70 formed on the inside of plates 48 and 50 of lever 42.

Actuation of the brake may be obtained by pulling on cable 72, which is connected to the end of lever 42 by means of clevis 74 and clevis pin 76. Pulling on cable 72 causes lever 42 to rotate in a horizontal plane, thereby spreading the unanchored ends of the brake shoes.

Figure 5 shows a sample installation of the brake of Figures 1 to 4 on the propeller shaft of an automotive vehicle. The support plate, or spider, 12, is mounted on the end of the bearing retainer 78 which engages the rear bearing 80 of the transmission main shaft 82. The brake drum 84 is secured to the flange 86, which is connected by means of bolts 88 to the trunion of the universal joint (not shown). The flange 86 is driven from main shaft 82 through the splined connection 90.

When lever 42 is rotated in the horizontal plane, the brake shoes are forced into engagement with drum 84, tending to inhibit rotation thereof and thus stop the vehicle.

Figure 6:
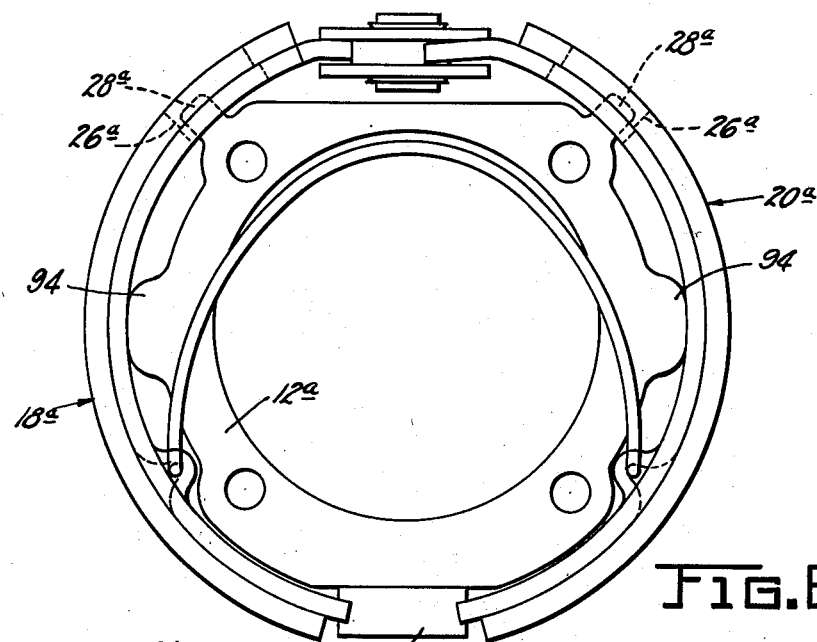
Figure 6 is an elevational view of a modified version of my improved brake.
Figure 4:
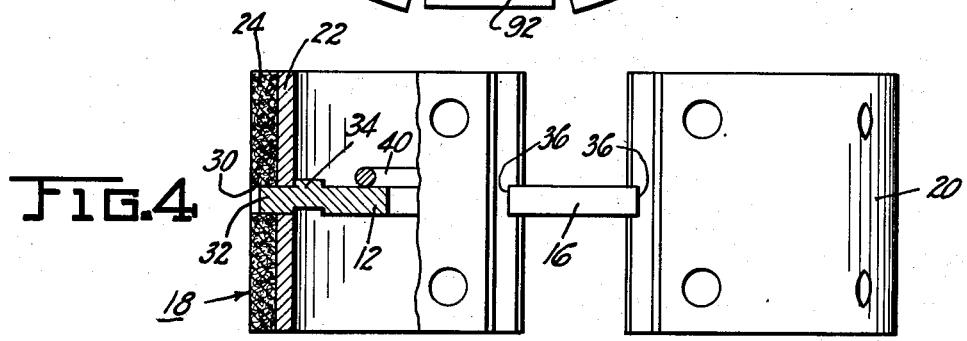
Figure 4 is a bottom view of the brake assembly of Figure 1.
Figure 7:
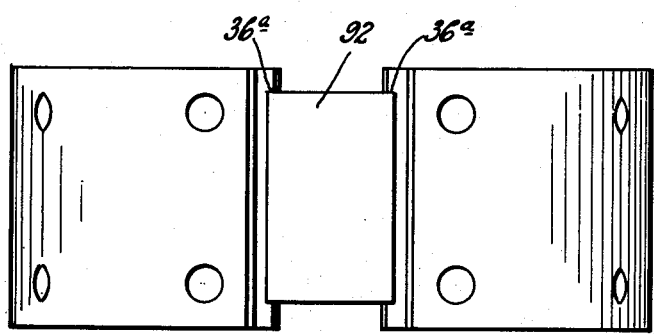
Figure 7 is a bottom view of the brake assembly of Figure 6.

Figures 6 and 7 show a slightly modified version of the brake of Figures 1 to 4. In this construction, the anchor for the shoes, instead of being an integral extension on the spider, 12a, is a relatively wide anchor block 92 which is welded to the spider. As before, the shoes have notched portions 36a which engage opposite sides of anchor 92. As compared with anchor 16 in Figure 1, anchor 92 has the advantage of providing a wider bearing surface for the ends of the shoes, and the disadvantage of increased cost.

The brake shown in Figures 6 and 7 also differs somewhat in the manner of positioning the shoes. Owing to the relatively wide surface of engagement between the lower end of each shoe and the anchor, it is considered necessary to have only one ear 28a extending into the radial slot 26a in each shoe web. Additional outwardly extending ears 94 are provided at opposite sides of the spider 12a, but instead of extending into slots in the shoes, they engage the undersides of the shoe rims to position the brake assembly concentrically with the drum.

From a study of the foregoing illustrative examples of my improved brake, it will be obvious that a structure has been provided which is very simple and uncomplicated in design, and which has a minimum number of components.

Although certain particular embodiments of my invention have been described, it will be understood by those skilled in the art that the objects of the invention may be attained by the use of constructions different in certain respects from those disclosed without departing from the underlying principles of the invention.

I claim:

1. For use in cooperation with a rotatable drum, a brake comprising a flat annular supporting plate which is adapted to be secured to a non-rotatable member and which has a radially-extending projection arranged to serve as a brake shoe anchor, two brake shoes each of which consists of a metal backing member and a lining secured thereto, said shoes each having a plurality of radial slots, ears on the supporting plate extending into the slots to guide the shoes, the metal backing member of each shoe having a notch at one end which engages the anchor projection and having a spring-retaining strap formed on its radially-inner side, a return spring constituted by a substantially U-shaped wire member having its ends in engagement with the straps of the respective shoes, the metal backing member of each brake shoe having a concave indentation formed in its unanchored end near one side thereof, the indentations in the opposed shoe ends being axially spaced from one another, an applying lever consisting of a pair of plates which are spaced apart at one end to receive the ends of the metal backing members of the shoes between the plates, the lever being supported by its engagement with the shoes, two axially-spaced pins carried between the plates, one of which engages the indentation in the end of one of the shoes, a strut pivoted on the other pin and engaging the indentation in the end of the other shoe, and a tension element connected to the lever and adapted to rotate the same to spread the unanchored ends of the shoes, forcing the shoes into an applied position.

2. For use in cooperation with a rotatable drum, a brake comprising a supporting plate which is adapted to be secured to a non-rotatable member and which has a radially-extending projection arranged to serve as a brake shoe anchor, two brake shoes each of which consists solely of a rim and a lining secured thereto, said shoes each having a plurality of radial slots, ears on the supporting plate extending into the slots to guide the shoes, the rim of each shoe having a notch at one end which engages the anchor projection and having a spring-retaining strap formed on its radially-inner side, a return spring constituted by a substantially U-shaped wire member having its ends in engagement with the straps of the respective shoes, the rim of each brake shoe having a concave indentation formed in its unanchored end near one side thereof, an applying lever consisting of a pair of plates which are spaced apart at one end to receive the ends of the shoe rims between the plates, the lever being supported by its engagement with the shoe rims, two axially-spaced pins carried between the plates, one of which engages the indentation in the end of one of the shoes, a strut pivoted on the other pin and engaging the indentation in the end of the other shoe, and an actuating element connected to the lever and adapted to rotate the same to spread the unanchored ends of the shoes, forcing the shoes radially outwardly to an applied position.

3. A brake comprising a supporting plate which is adapted to be secured to a non-rotatable member and which has a radially-extending projection arranged to serve as a brake shoe anchor, two brake shoes each of which consists solely of a rim and a lining secured thereto, said shoes each having a plurality of radial slots, ears on the supporting plate extending into the slots to guide the shoes, the rim of each shoe having a notch at one end which engages the anchor projection, a return spring having its ends in engagement with the respective shoes, the rim of each brake shoe having a concave indentation formed in its unanchored end near one side thereof, an applying lever consisting of a pair of plates which are spaced apart at one end to receive the ends of the shoe rims between the plates, two axially-spaced pins carried between the plates, one of which engages the indentation in the end of one of the shoes, a strut pivoted on the other pin and engaging the indentation in the end of the other shoe, and an actuating element connected to the lever and adapted to rotate the same to spread the unanchored ends of the shoes, forcing the shoes into an applied position.

4. A brake comprising a supporting plate which is adapted to be secured to a non-rotatable member and which has a radially-extending projection arranged to serve as a brake shoe anchor, two brake shoes each of which consists solely of a rim and a lining secured thereto, said shoes each having a plurality of radial slots, ears on the supporting plate extending into the slots to guide the shoes, the rim of each shoe having a notch at one end which engages the anchor projection, a return spring having its ends in engagement with the respective shoes, the rim of each brake shoe having a concave indentation formed in its unanchored end near one side thereof, an applying lever having spaced apart side portions which receive the ends of the shoe rims therebetween, two axially-spaced pins carried by the lever, one of which engages the indentation in the end of one of the shoes, and a strut pivoted on the other pin and engaging the indentation in the end of the other shoe.

5. A brake comprising a supporting plate which is adapted to be secured to a non-rotatable member and which has a radially-extending projection arranged to serve as a brake shoe anchor, two brake shoes each of which consists solely of a rim and a lining secured thereto, said shoes each having one or more slots, ears on the supporting plate extending into the slots to guide the shoes, the rim of each shoe having a notch at one end which engages the anchor projection and having an indentation formed in its unanchored end near one side thereof, an applying lever having spaced apart side portions which receive the ends of the shoe rims therebetween, and two axially-spaced pins carried by the lever, each operatively engaging the indentation in the end of one of the shoes.

6. A brake comprising a supporting plate which is adapted to be secured to a non-rotatable member and which has a radially-extending projection arranged to serve as a brake shoe anchor, two brake shoes each of which consists solely of a rim and a lining secured thereto, said shoes each having one or more radial slots, ears on the supporting plate extending into the slots to guide the shoes, each shoe having a notch at one end which engages the anchor projection, a return spring having its ends in engagement with the respective shoes, and an actuating member adapted to act on the unanchored ends of the shoes to spread the same.

7. A brake comprising a supporting plate which is adapted to be secured to a non-rotatable member and which has a radially-extending projection arranged to serve as a brake shoe anchor, two brake shoes each of which consists solely of a flat arcuate strip, said shoes each having one or more slots, ears on the supporting plate extending into the slots to guide the shoes, each shoe having a notch at one end which engages the anchor projection, and an actuating member adapted to act on the unanchored ends of the shoes to spread the same.

8. A brake comprising a supporting member which is adapted to be secured to a non-rotatable member and which carries an anchor projection, two brake shoes each of which consists of a flat arcuate strip, said shoes each having one or more slots, ears on the supporting member extending into the slots to guide the shoes, each shoe having a notch at one end which engages the anchor projection, and an actuating member adapted to act on the unanchored ends of the shoes to spread the same.

9. A brake comprising a supporting member which is adapted to be secured to a non-rotatable member and which carries an anchor projection, two brake shoes each of which consists of a flat arcuate strip, said shoes each having one or more slots, ears on the supporting member extending into the slots to guide the shoes, one end of each shoe engaging the anchor projection, and an actuating member adapted to act on the unanchored ends of the shoes to spread the same.

10. A brake comprising a supporting member which has an anchor projection, two brake shoes each of which consists solely of a flat arcuate strip, means on the supporting member for cooperatively guiding the shoes, one end of each shoe engaging the anchor projection, and an actuating member adapted to act on the unanchored ends of the shoes to spread the same.

11. A brake comprising a supporting member having an anchor thereon, two brake shoes each of which consists of a flat arcuate strip, means on the supporting member for cooperatively guiding the shoes, one end of each shoe slidably engaging the anchor, each shoe having a concave indentation formed in its unanchored end near one side thereof, the indentations in the opposed shoe ends being axially spaced from one another, an applying lever consisting of a pair of plates which are spaced apart at one end to receive the ends of the shoes between the plates, the lever being supported by its engagement with the shoes, two axially-spaced pins carried between the plates, one of which engages the indentation in the end of one of the shoes, a strut pivoted on the other pin and engaging the indentation in the end of the other shoe, and an actuating element connected to the lever and adapted to rotate the same to spread the unanchored ends of the shoes.

12. A brake comprising a supporting member having an anchor thereon, two brake shoes each of which consists of a flat arcuate strip, means on the supporting member for cooperatively guiding the shoes, one end of each shoe slidably engaging the anchor, each shoe haivng a concave indentation formed in its unanchored end near one side thereof, an applying lever consisting of a pair of plates which are spaced apart at one end to receive the ends of the shoes between the plates, the lever being supported by its engagement with the shoes, two axially-spaced pins carried between the plates, one of which engages the indentation in the end of one of the shoes, a strut pivoted on the other pin and engaging the indentation in the end of the other shoe, and an actuating element connected to the lever and adapted to rotate the same to spread the unanchored ends of the shoes.

13. A brake comprising a supporting member having an anchor thereon, two brake shoes each of which consists of a flat arcuate strip, means on the supporting member for cooperatively guiding the shoes, one end of each shoe slidably engaging the anchor, each shoe having an indentation formed in its unanchored end near one side thereof, an applying lever consisting of a pair of plates which are spaced apart at one end to receive the ends of the shoes between the plates, two axially-spaced pins carried between the plates, one of which engages the indentation in the end of one of the shoes, and a strut pivoted on the other pin and engaging the indentation in the end of the other shoe.

14. A brake actuating device comprising two brake shoes each of which has a flat arcuate rim, each shoe having an indentation formed in its unanchored end near one side thereof, an applying lever carried by said shoes having spaced apart side portions which receive the ends of the shoes therebetween, and two axially-spaced shoe-engaging elements carried by the lever, each operatively engaging the indentation in the end of one of the shoes.

15. A brake actuating device comprising two brake shoes each of which has a flat arcuate rim, an applying lever carried by said shoes having spaced apart side portions which receive the ends of the shoes therebetween, and two axially-spaced shoe-engaging elements carried by the lever, each operatively engaging the end of one of the shoes.

16. A brake actuating device comprising two brake shoes each of which has a flat arcuate rim, an applying lever carried by the shoes, and two axially-spaced shoe-engaging elements carried by the lever, each operatively engaging the end of one of the shoe rims.

17. A brake comprising a supporting plate which is adapted to be secured to a non-rotatable member and which has a radially-extending projection arranged to serve as a brake shoe anchor, a friction means having a plurality of radial slots, ears on the supporting plate extending into the slots to guide said friction means, an applying lever consisting of a pair of plates which are spaced apart at one end to receive the ends of the friction means between the plates, and an actuating element connected to the lever and adapted to rotate the same to spread the ends of the friction means, forcing said means into engagement with the drum.

18. A brake comprising a supporting plate which is adapted to be secured to a non-rotatable member and which has a radially-extending projection arranged to serve as a brake shoe anchor, a friction element having a plurality of radial slots, ears on the supporting plate extending into the slots to guide said element, and an applying lever having spaced apart side portions which receive the ends of the friction element therebetween.

19. A brake comprising a supporting plate which is adapted to be secured to a non-rotatable member and which has a radially-extending projection arranged to serve as a brake shoe anchor, a friction element having a plurality of radial slots, ears on the supporting plate extending into the slots to guide said element and an applying means located oppositely from said anchor and interposed between the ends of said friction element.

BRYAN E. HOUSE.

References Cited in the file of this patent

UNITED STATES PATENTS

| Number | Name | Date |
|---|---|---|
| 1,556,884 | Whitacre | Oct. 13, 1925 |
| 1,767,621 | Shields et al. | June 24, 1930 |
| 1,816,155 | Perrot | July 28, 1931 |
| 1,832,136 | Oliver | Nov. 17, 1931 |
| 1,913,156 | Frehse | June 6, 1933 |
| 1,930,417 | Smith-Clarke | Oct. 10, 1933 |
| 1,978,723 | Rosner | Oct. 30, 1934 |
| 2,028,625 | Rosner | Jan. 21, 1936 |
| 2,044,988 | La Brie et al. | June 23, 1936 |
| 2,163,879 | House | June 27, 1939 |

FOREIGN PATENTS

| Number | Country | Date |
|---|---|---|
| 562,359 | Germany | May 24, 1931 |
| 307,245 | France | Mar. 26, 1903 |
| 722,154 | France | Mar. 14, 1932 |